Oct. 11, 1938.   J. E. HULSE   2,133,196
HYDRAULIC EQUALIZER FOR VEHICLE BRAKES
Filed Aug. 20, 1936   2 Sheets-Sheet 1

Inventor
JAMES E. HULSE
By Norm + Bateman
Attorneys

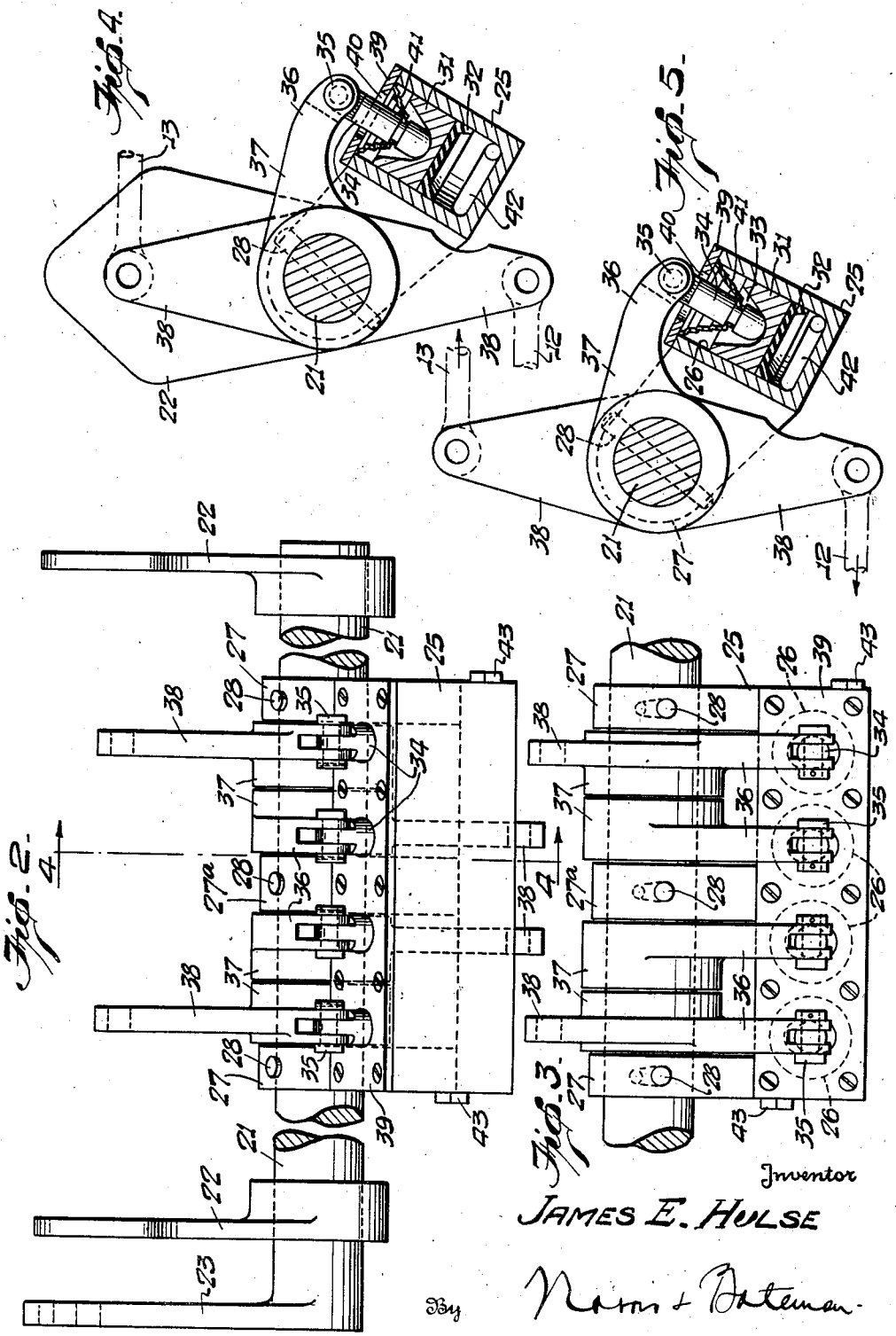

Patented Oct. 11, 1938

2,133,196

UNITED STATES PATENT OFFICE 2,133,196

HYDRAULIC EQUALIZER FOR VEHICLE BRAKES

James Edward Hulse, Durham, N. C., assignor of one-fourth to Wright's Automatic Tobacco Packing Machine Company, Durham, N. C., a corporation of West Virginia Application August 20, 1936, Serial No. 97,067

1 Claim. (Cl. 188—204)

The present invention relates to brakes for automotive vehicles, and more especially to those employing multiple brakes such as four-wheel brakes for the front and rear wheels of such vehicles, and it is an improvement upon that shown and described in my prior application Serial No. 33,892 filed July 30, 1935, now United States Patent No. 2,054,752 issued Sept. 15, 1936.

One of the primary objects of the present invention is to simplify and improve hydraulic equalizing means such as that shown and described in my said prior application.

A more particular object is to provide an improved construction for such hydraulic equalizing means, whereby greater strength and rigidity under the braking forces applied to it are afforded and improved functioning of the brake equalizing and applying members are attained, although the improved equalizing mechanism is adapted to be readily applied to automotive vehicles and connected to the usual and conventional arrangement of the brake pedal and brake rods or members as a substitute for a part of the usual brake mechanism.

Another object of the present invention is to provide equalizing means of this character which is adapted to employ a jelly or relatively heavy grease as the equalizing fluid.

To these and other ends the invention consists in certain improvements and combinations and arrangements of parts all as will be hereinafter more fully described, the features of novelty being pointed out more particularly in the claim at the end of this specification.

In the accompanying drawings:

Figure 2 is an elevation, on an enlarged scale showing the improved hydraulic equalizing means as viewed from the left on the line 2—2 in Figure 1;

Figure 3 is a top plan view of a part of the structure shown in Figure 2;

Figure 4 is a vertical section taken on the line 4—4 in Figure 2, showing the equalizing means in its normal inactive condition;

Figure 5 is a view similar to Figure 4 but showing the equalizing means in its active condition;

Similar parts are designated by the same reference characters in the different figures.

Figure 1:
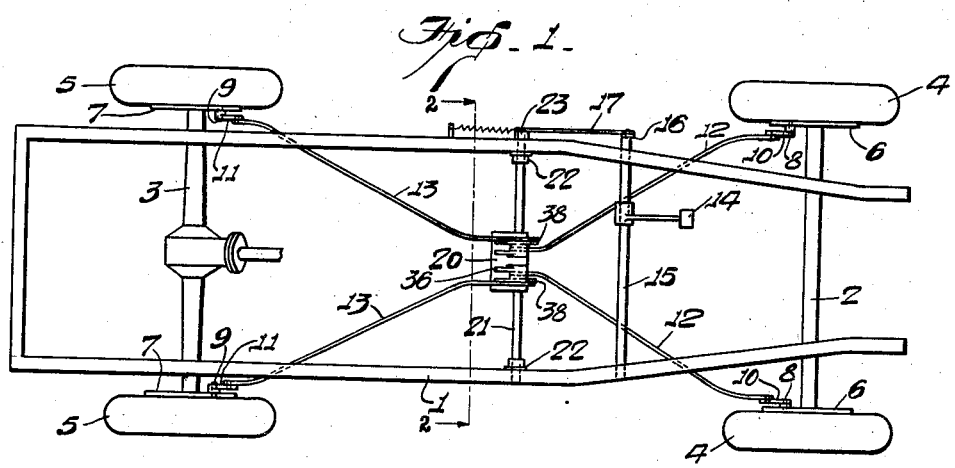
Figure 1 is a top plan view of the chassis of an automobile equipped with hydraulic brake equalizing means according to the present invention.
Figures 7, 8:
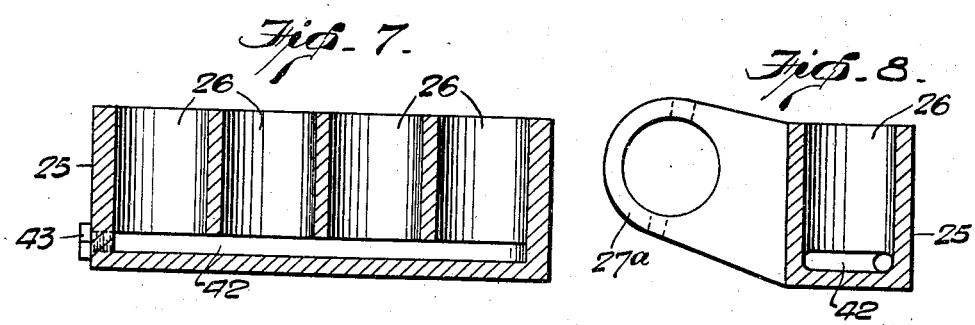
Figure 7 is a section taken on the line 7—7 in Figure 6.
Figure 8 is a section taken on the line 8—8 in Figure 6.

Hydraulic equalizing means according to the present invention is applicable generally to the brakes of vehicles of various kinds and it is applicable more particularly to the multiple brakes such for example as the four-wheel brakes, of automotive vehicles, for the purpose of producing equal brake action by the different brake units comprising the brake system. The preferred embodiment of the invention is shown in the accompanying drawings and will be hereinafter described in detail, but it is to be understood that the invention is not restricted to the precise construction shown since equivalent constructions are contemplated and such will be included in the scope of the claim.

The invention is shown in the accompanying drawings as applied to an automobile of conventional construction equipped with four-wheel brakes, 1 designating the usual automobile frame, 2 and 3 the front and rear axles and 4 and 5 the front and rear wheels, the front wheels being provided respectively with brakes 6 and the rear wheels being provided respectively with brakes 7. The brakes may be of any conventional or preferred form the details of which form no part of this invention, the brakes being shown for purposes of illustration as provided with cam shafts 8 and 9 having levers 10 and 11 thereon for rocking them to expand an internal band, for example, into braking engagement with the brake drums fixed to the respective wheels, as common and well known in the art. The levers 10 for actuating the front wheel brakes are operated as usual by a pair of brake rods or cables 12 which are adapted to be pulled rearwardly to set these brakes, and the actuating levers 11 for the brakes of the rear wheels are connected to a pair of brake rods or cables 13 which are adapted to be pulled forwardly to set said brakes. The brake pedal 14, by which the brakes are set may be mounted on a cross shaft 15 supported in the automobile frame, this pedal for example being fixed to the shaft 15 and the latter having a lever 16 fixed thereon and connected to a main brake rod 17.

The front and rear wheel brakes are all operated mechanically by depressing or pressing forwardly the brake pedal 14, and the brake action transmitted from the brake pedal to the individual brakes is equalized hydraulically or through an equalizing fluid, by equalizing means 20 which is connected to the brake rods or members 12 and 13 and the main brake rod 17, and such equalizing means may be mounted in the automobile frame in place of the rock shaft heretofore used generally for actuating the brake rods or members. The equalizing means, according to the present invention, comprises a rigid shaft 21 which preferably extends transversely across the automobile frame in place of the usual rock shaft, it being rotatably mounted on the side members of the automobile frame, by a pair of bearing brackets 22 which may be bolted, riveted or otherwise secured to the side members of the automobile frame, the shaft 21 being mounted rotatably in these bearing brackets. One end of the shaft 21 has an arm or lever 23 fixed thereon, this arm or lever being operatively connected to the main brake rod 17.

The equalizing means also comprises a casing 25 which is formed with a row of cylinders 26 which correspond in number to the number of brakes comprising the brake system, four cylinders being shown in the present instance. This casing is formed with a pair of arms 27 at its ends and with a similar arm 27ª intermediate its ends, and these arms are fixed to the shaft 21, as by the key pins 28, so that the casing 25 is supported to swing or rock with the shaft 21 and about the axis thereof when the shaft 21 is rocked or rotated under pull of the main brake rod 17 when the pedal 14 is pushed forwardly or depressed, as in applying the brakes.

Each cylinder 26 in the casing 25 has a piston or plunger 31 fitted to reciprocate therein, and a cupped rubber or other suitable sealing cap 32 is provided beneath each piston. The upper end of each piston is formed with a recess 33 in which a connecting rod 34 rests, the upper end of each connecting rod being pivotally connected by a pivot pin 35 to one arm 36 of a bell crank lever 37. One of these bell crank levers 37 is provided for each piston and these bell crank levers are arranged in a row and are loosely or rotatably mounted on the shaft 21 so that they may rotate independently thereon. Preferably and as shown these bell crank levers are mounted in pairs between the respective arms 27 at the ends of the cylinder block or casing 25 and the intermediate arm 27ª, one arm of each bell crank lever being operatively connected to the respective piston, and each bell crank lever has another arm 38, these arms of two of the bell crank levers extending upwardly and being pivotally or operatively connected to the rods or members 13 which are connected to the brakes for the rear wheels and these arms 38 of the other pair of bell crank levers extending downwardly from the shaft 21 and being pivotally or operatively connected to the rods or members 12 for the brakes of the front wheels. The tops of the cylinders in the cylinder block or casing 25 are covered by a cover plate 39 which is secured to the top of this casing, this cover plate having slot-like openings 40 therein through which the respective connecting rods 34 extend, these openings 40 being narrower than the length of the pivot pins 35 so that the ends of these pivot pins will bear firmly on the top of the cover plate 39 in the event the pistons move beyond a predetermined extent in their cylinders. In order to seal the cylinders against the entrance of dust, a substantially conical corrugated dust cap of rubber or other suitable flexible material 41 may be attached to each connecting rod and fitted into the upper end of the respective cylinder or in any other suitable location.

An inter-communicating passageway 42 is formed in the cylinder block or casing and communicates with the bottoms of all of the cylinders therein. The bottoms of the cylinders 26 and the passageway 42 are filled with a suitable fluid, preferably a relatively heavy fluid such as petroleum jelly or a fluid grease which will have a minimum tendency to leak past the pistons in the cylinders but will be freely flowable in the cylinders and between them through the inter-communicating passageway 42. The inter-communicating passageway 42 is relatively large to minimize resistance to the flow of the relatively heavy fluid between the cylinders, it being preferably of a width equal to the full diameter of the cylinders or substantially so. This inter-communicating passageway 42 may be formed in the cylinder block 25 in any suitable way, it being for example cored therein when the cylinder block is cast, and screw plugs 43 may be threaded into holes in the cylinder block at the ends of the passageway 42 to close the holes employed for supporting the core during the casting operation. The fluid may be introduced into the cylinder block or casing or replenished whenever necessary, by removing one of these screw plugs 43.

The mode of operation of the brake system herein shown and provided with hydraulic equalizing means according to the present invention, is as follows: Normally or when the brakes are not applied, the cylinder block or casing 25 will occupy its relatively lowered position as shown in Figure 4, the brake pedal 14 being then in its rear or non-actuated position. The pistons 31 in the cylinders 26 will then occupy positions near the tops of said cylinders. The brakes are applied by depressing or pushing forwardly the brake pedal 14. Such movement of the brake pedal tensions the main brake rod 17 which, acting on the arm or lever 23, rocks the shaft 21 and thereby swings the cylinder block or casing 25 fixed thereto upwardly or into the position shown in Figure 5. Since the spaces in the cylinders beneath the pistons are filled with fluid and such fluid is confined within the casing, such fluid will be placed under compression by the upward swing of the casing 25 and will act to transmit motion and power from the casing to the pistons therein and cause the latter to move upwardly with the casing, and since the pistons are connected individually to the respective bell crank levers 37, the motion and power thus imparted to the pistons by the fluid will be transmitted individually to the respective brake rods or members 12 and 13, causing the latter to be actuated in directions to apply the brakes on the front and rear wheels. Since a separate piston and cylinder is provided for each of the bell crank levers and the cylinders are in inter-communication through the passageway 42, equal brake applying force will be applied to each one of the four brake rods or members since the hydraulic pressure applied to the fluid will act equally on all of the pistons. Equal brake action will thus be produced on each of the brakes of the vehicle, notwithstanding that the brakes or connections may be adjusted unequally, the body of fluid acting in common upon all of the pistons and functioning as an equalizing medium. For example, if one or more of the brakes or their connections are not properly adjusted to produce effective brake action on the respective wheel or wheels, the pistons connected to the other brakes will relatively move downwardly in their cylinders as shown in Figure 5, thus forcing fluid from these cylinders into the cylinders for the pistons connected to the brakes which are inefficiently adjusted, thereby insuring the transmission of power equally to all of the brakes to effect equalized brake action thereon.

Should the cylinder block or casing contain an insufficient amount of fluid to transmit the required movement between the cylinder block and the cylinders to set the brakes, the upward swing of the cylinder block or casing 25 under the action of the brake pedal in applying the brakes will bring the cover plate 39 into direct mechanical engagement with the pivot pins 35 connected to the bell crank levers 37, and the movement of the brake pedal will then be transmitted directly and mechanically to the brake rods or members and effect application of the brakes, thus avoiding failure of the brakes in the event of a deficiency in the amount of fluid contained in the cylinders.

The hydraulic equalizing means provided by the present invention may be readily and inexpensively applied to automobiles in place of the usual rock shafts for actuating the brake rods or members, the shaft 21 being capable of substitution for the usual rock shaft without requiring any alteration in the rest of the brake system, which may be of any usual or conventional construction, and since the equalizing fluid is confined within the cylinder block, leakage of such fluid is minimized.

By mounting the cylinder block or casing and the bell crank levers on a rigid rock shaft, as herein shown and described, these parts of the equalizing means may be mounted in the middle or at any point in the length of this shaft and between the side members of the automobile frame and the strains applied between the bell crank levers and the brake applying rods or members will be effectively sustained so that the bell crank levers will be freely rotatable independently on the rock shaft and binding thereof prevented. By mounting the bell crank levers in a row on the rock shaft and between the arms of the cylinder block which secure it to the rock shaft, the forces applied by the pistons in the cylinder block to the bell crank lever will be sustained effectively with minimum tendency to bend the rock shaft, and this construction moreover is very compact so that the equalizing means may be readily accommodated within the frame of an automobile.

Figures 6, 9, 10:
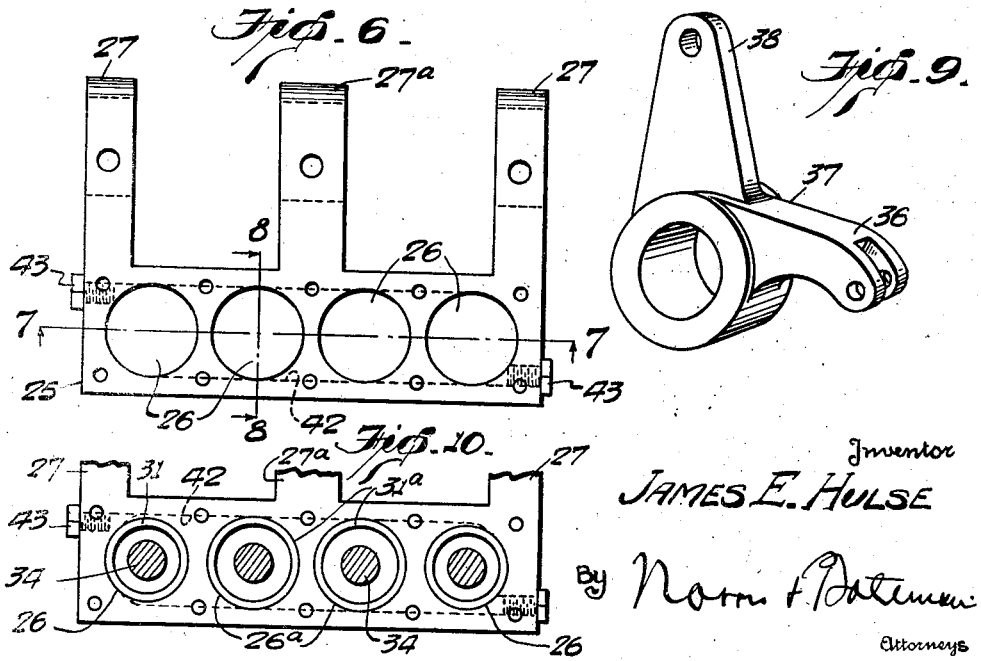
Figure 6 is a top plan view of the casing forming the cylinders for the equalizing means.
Figure 9 is a detail perspective view of one of the equalizing levers.
Figure 10 is a view similar to Fig. 6 but showing the cylinders and pistons for the front and rear wheel brakes of different relative sizes to obtain a different ratio of braking power applied to the front and rear wheel brakes.

The diameter of the cylinder bores can be altered from one size to another, changing the ratio of braking power applied to the front and rear wheels, such for example, as 40% braking in the rear and 60% in front. Such a result may be accomplished by making the front wheel cylinders and pistons a little larger in size or diameter than the cylinders and pistons for the rear wheels, as shown in Fig. 10. As an example—the size of the rear wheel cylinders 26 and the pistons 31 therein may be 1″, and the size of the front wheel cylinders 26a and the pistons 31a therein may be 1⅛″, thereby giving hydraulic action with different ratio of braking power using the same length of brake levers.

The present invention enables a brake system to be used which comprises mechanically actuated brakes at the wheels of the vehicle the action of which is equalized hydraulically, without the disadvantages of employing hydraulic brake actuating cylinders at the wheels and extending piping thereto as in so-called hydraulic brakes as heretofore used, and the safety means provided as hereinbefore described, insures effective brake action at all times and under all conditions.

I claim as my invention:—

In brake mechanism for vehicles having a frame embodying side members, front and rear wheel brakes, an operating member and a plurality of brake actuating members operative thereby to operate the front and rear wheel brakes, the combination of a shaft, bearing brackets at the ends of said shaft and attachable to the respective side members of the frame for rotatably mounting said shaft in the vehicle to extend continuously between the side members of the frame thereof, means for connecting the operating member to said shaft for rotating it, a fluid containing member mounted on said shaft between said bearing brackets and connected to said shaft for rotation therewith, said member having a series of intercommunicating cylinders arranged in a row parallel to said shaft, a plurality of equalizing members mounted in a row on said shaft between said bearing brackets to rotate independently thereon and having means for connecting them to the respective brake actuating members, pistons arranged in a single row parallel to said shaft, said pistons being mounted in the respective cylinders and subject in common to pressure applied to the fluid in said fluid containing member, and means pivotally connecting said pistons to the respective equalizing members.

JAMES EDWARD HULSE.